United States Patent
Ogahara et al.

(10) Patent No.: US 12,139,230 B2
(45) Date of Patent: Nov. 12, 2024

(54) STRADDLE TYPE VEHICLE AND CONTROL UNIT FOR STEERING TORQUE DAMPING

(71) Applicant: HONDA MOTOR CO., LTD., Tokyo (JP)

(72) Inventors: Atsushi Ogahara, Tokyo (JP); Tsubasa Nose, Tokyo (JP); Ranju Imao, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 17/702,951

(22) Filed: Mar. 24, 2022

(65) Prior Publication Data

US 2022/0212746 A1      Jul. 7, 2022

Related U.S. Application Data

(63) Continuation of application No. PCT/JP2020/034632, filed on Sep. 14, 2020.

(30) Foreign Application Priority Data

Sep. 27, 2019   (JP) .................... 2019-177709

(51) Int. Cl.
   *B62K 21/08*    (2006.01)
   *F16F 9/14*     (2006.01)

(52) U.S. Cl.
   CPC .............. *B62K 21/08* (2013.01); *F16F 9/145* (2013.01)

(58) Field of Classification Search
   CPC ..................................................... B62K 21/08
   See application file for complete search history.

(56) References Cited

U.S. PATENT DOCUMENTS

| | | | |
|---|---|---|---|
| 8,606,464 B2 * | 12/2013 | Suzuki ................ | B62K 21/00 180/219 |
| 8,775,024 B2 | 7/2014 | Hara et al. | |
| 9,126,652 B2 | 9/2015 | Matsuo et al. | |
| 9,403,575 B2 | 8/2016 | Haas et al. | |
| 10,279,857 B2 | 5/2019 | Tetsuka et al. | |
| 10,953,890 B2 * | 3/2021 | Tokunaga ............ | B62K 21/00 |

(Continued)

FOREIGN PATENT DOCUMENTS

| | | |
|---|---|---|
| CN | 107531308 A | 1/2018 |
| JP | 2009-126432 A | 6/2009 |

(Continued)

OTHER PUBLICATIONS

Indian Office Action for Indian Patent Application No. 202217015370 mailed Jul. 21, 2022 (partially translated).

(Continued)

*Primary Examiner* — Todd Melton
(74) *Attorney, Agent, or Firm* — Thomas | Horstemeyer, LLP

(57) ABSTRACT

A straddle type vehicle comprises a steering mechanism configured to steer a front wheel; a steering damper device capable of variably generating a damping force working on a rotating action of the steering mechanism; and a control unit configured to control the damping force of the steering damper device. The control unit controls the damping force, based on a change amount per unit time of steering torque generated in the steering mechanism and a deceleration of the front wheel.

9 Claims, 9 Drawing Sheets

(56) References Cited

U.S. PATENT DOCUMENTS

| | | |
|---|---|---|
| 2009/0302557 A1 | 12/2009 | Hara et al. |
| 2015/0057888 A1 | 2/2015 | Haas et al. |
| 2015/0081172 A1 | 3/2015 | Matsuo et al. |
| 2018/0079465 A1 | 3/2018 | Tetsuka et al. |

FOREIGN PATENT DOCUMENTS

| | | |
|---|---|---|
| JP | 5255329 B2 | 8/2013 |
| JP | 2015-514039 A | 5/2015 |
| WO | 2013/168422 A1 | 11/2013 |
| WO | 2017/057514 A1 | 4/2017 |
| WO | 2021/060039 A1 | 4/2021 |

OTHER PUBLICATIONS

International Search Report for PCT/JP2020/034632 mailed Nov. 2, 2020 with partial English Translation.

\* cited by examiner

STRADDLE TYPE VEHICLE AND CONTROL UNIT FOR STEERING TORQUE DAMPING

CROSS-REFERENCE TO RELATED APPLICATION(S)

This application is a continuation of International Patent Application No. PCT/JP2020/034632 filed on Sep. 14, 2020, which claims priority to and the benefit of Japanese Patent Application No. 2019-177709 filed on Sep. 27, 2019, the entire disclosures of which are incorporated herein by reference.

BACKGROUND OF THE INVENTION

Field of the Invention

The present invention relates to a straddle type vehicle and a control device.

Description of the Related Art

A straddle type vehicle provided with a steering damper is known. International Publication No. 2013/168422 discloses a technique for suppressing a vibration of a steering mechanism by controlling a damping force of a steering damper, based on a state of a vehicle, such as a load applied to a front wheel and a steering angle of the steering mechanism.

SUMMARY OF THE INVENTION

According to an embodiment of the present invention, there is provided a straddle type vehicle comprising:
a steering mechanism configured to steer a front wheel;
a steering damper device capable of variably generating a damping force working on a rotating action of the steering mechanism; and
a control unit configured to control the damping force of the steering damper device, wherein
the control unit controls the damping force, based on a change amount per unit time of steering torque generated in the steering mechanism and a deceleration of the front wheel.

Also, according to another embodiment of the present invention, there is provided a control device to be applied to a straddle type vehicle, the straddle type vehicle including a steering mechanism that steers a front wheel and a steering damper device capable of variably generating a damping force working on a rotating action of the steering mechanism, the control device being configured to control the damping force of the steering damper device, wherein
the control device controls the damping force, based on a change amount per unit time of steering torque generated in the steering mechanism and a deceleration of the front wheel.

DESCRIPTION OF THE EMBODIMENTS

Figure 1:
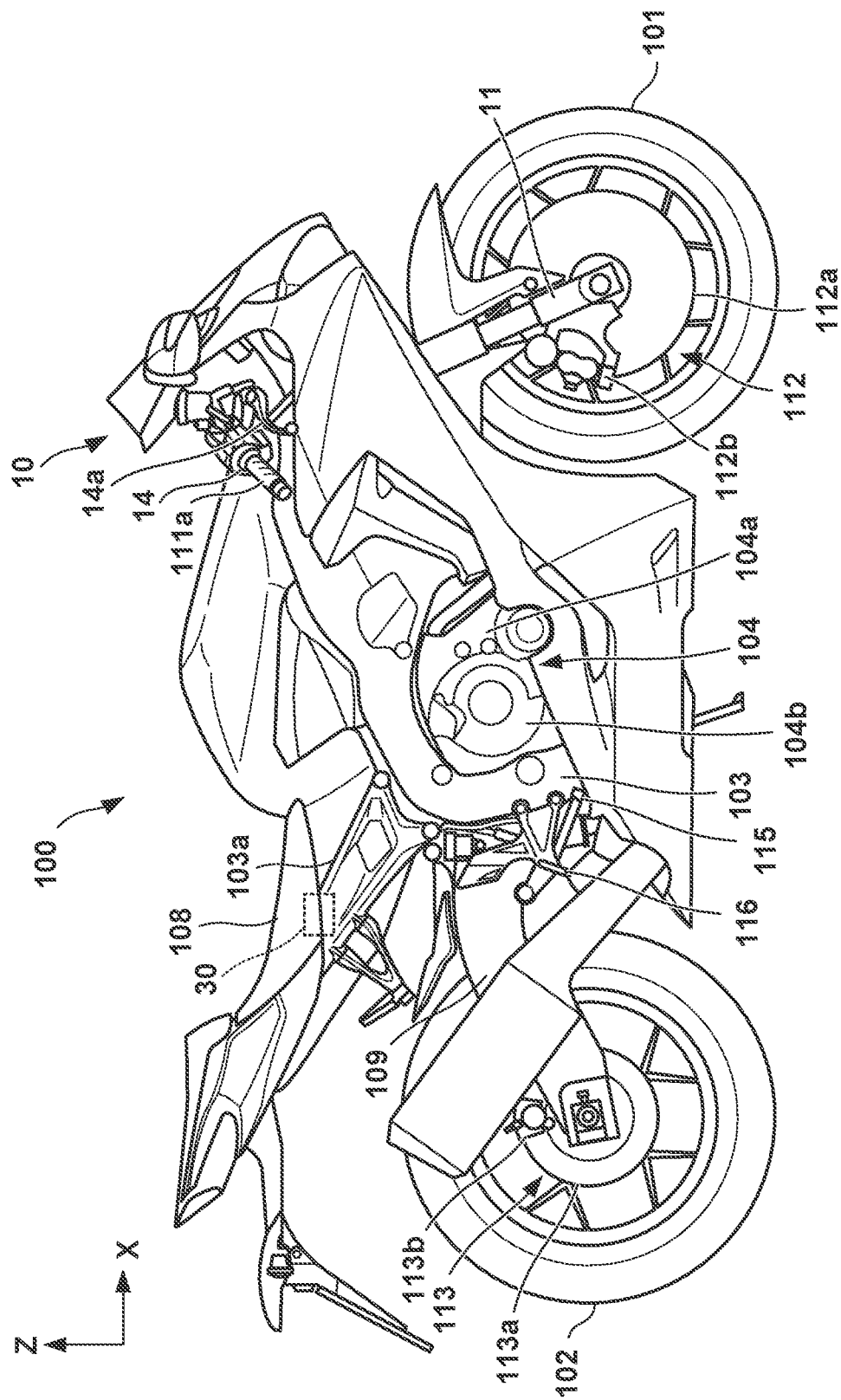
FIG. 1 is a side view of a vehicle according to one embodiment.

In the straddle type vehicle, incidentally, when the brake is applied while turning, the steering mechanism may oscillate in some cases, and there is a demand for suppressing such an oscillation.

An embodiment of the present invention provides a technique for suppressing an oscillation of a steering mechanism at the time of braking while turning.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each drawing, arrows X and Y indicate horizontal directions orthogonal to each other, and an arrow Z indicates a vertical direction. In the following description, the traveling direction of the vehicle is defined as X direction, which is set to a front-and-rear direction, and the front and the rear are defined. In addition, a vehicle width direction of the vehicle is defined as Y direction, which is set to a left-and-right direction with a forward direction of the vehicle as a reference, and the left and the right are defined.

First Embodiment

Outline of Straddle Type Vehicle

Figure 2:
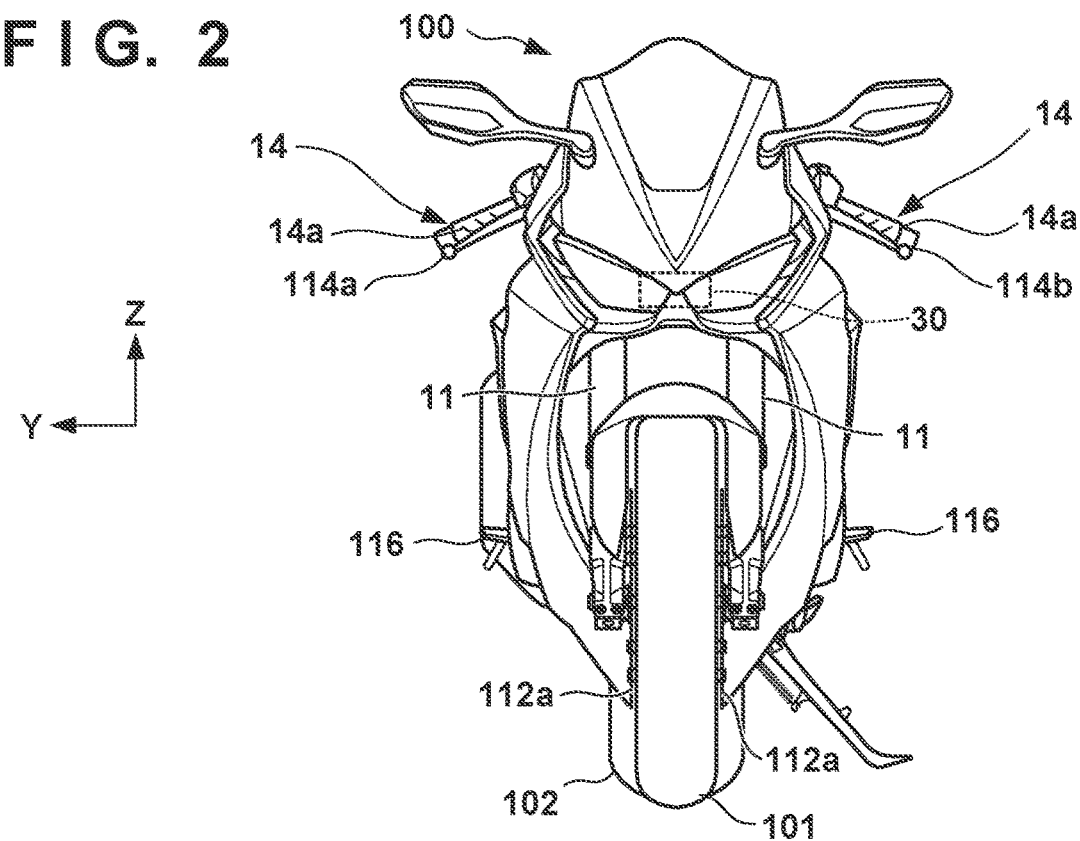
FIG. 2 is a front view of the vehicle of FIG. 1.

FIG. 1 is a side view (a right side view) of a straddle type vehicle 100 according to one embodiment, and FIG. 2 is a front view of the vehicle 100, illustrating an outline of the vehicle 100. FIGS. 1 and 2 respectively illustrate a side view and a front view in a state in which the vehicle 100 stands in a vertical posture. For the vehicle 100 in the present embodiment, a motorcycle including a front wheel 101 and a rear wheel 102 is given as an example, but the present invention is also applicable to any other type of the straddle type vehicle.

The vehicle 100 includes a vehicle body frame 103 forming its backbone. A power unit 104 that drives the rear wheel 102 is supported at the vehicle body frame 103. The power unit 104 includes an engine 104a (for example, a multi-cylinder four-cycle engine) and a transmission 104b that changes an output from the engine 104a, and the output from the transmission 104b is transmitted by a chain transmission mechanism to the rear wheel 102.

A seat frame 103a that supports a seat 108 on which the rider is seated is coupled with a rear portion of the vehicle body frame 103. A swing arm 109 is swingably supported by the rear portion of the vehicle body frame 103, and the rear wheel 102 is rotatably supported by the swing arm 109.

A head pipe is provided in a front portion of the vehicle body frame 103. The head pipe rotatably supports a steering mechanism 10.

The steering mechanism 10 steers the front wheel 101, and includes a pair of front forks 11, a top bridge 12, a bottom bridge 13, and left and right handlebars 14. The pair of front forks 11 are rotatably supported by the head pipe. The pair of front forks 11 are coupled at upper end portions by the top bridge 12, and are coupled by the bottom bridge 13 below the top bridge 12. A steering stem (not illustrated) is attached to extend between the top bridge 12 and the bottom bridge 13, and the steering stem is rotatably attached in the head pipe.

In upper portions of the pair of front forks 11, separate-type left and right handlebars 14 for steering the front wheel 101 are provided, and the handlebars 14 are each provided with a grip 14a to be gripped by the rider. The left and right handlebars 14 are disposed to be inclined downward toward the outside in the vehicle width direction in a vehicle front view, and are disposed for the rider to easily get on the vehicle in a forward inclined posture.

The vehicle 100 includes braking devices 112 and 113. The braking device 112 is a braking device for the front wheel 101, and includes a brake disc 112a provided on the front wheel 101 and a brake caliper 112b supported by the front fork 11. The right handlebar 14 is provided with a brake lever 114a for operating the brake caliper 112b. The left handlebar 14 is provided with a clutch lever 114b for operating the clutch of the transmission 104b.

The braking device 113 is a braking device for the rear wheel 102, and includes a brake disc 113a provided on the rear wheel 102 and a brake caliper 113b supported by the swing arm 109. A brake pedal 115 for operating the brake caliper 113b is provided on a right side portion of the vehicle 100. Steps 116 on which the rider places its legs are respectively provided on the left and the right side portions of the vehicle 100. A brake pedal 115 is disposed near the step 116 on the right side, and a shift pedal, not illustrated, is disposed near the step 116 on the left side.

Configuration of Steering Damper

Figure 3:
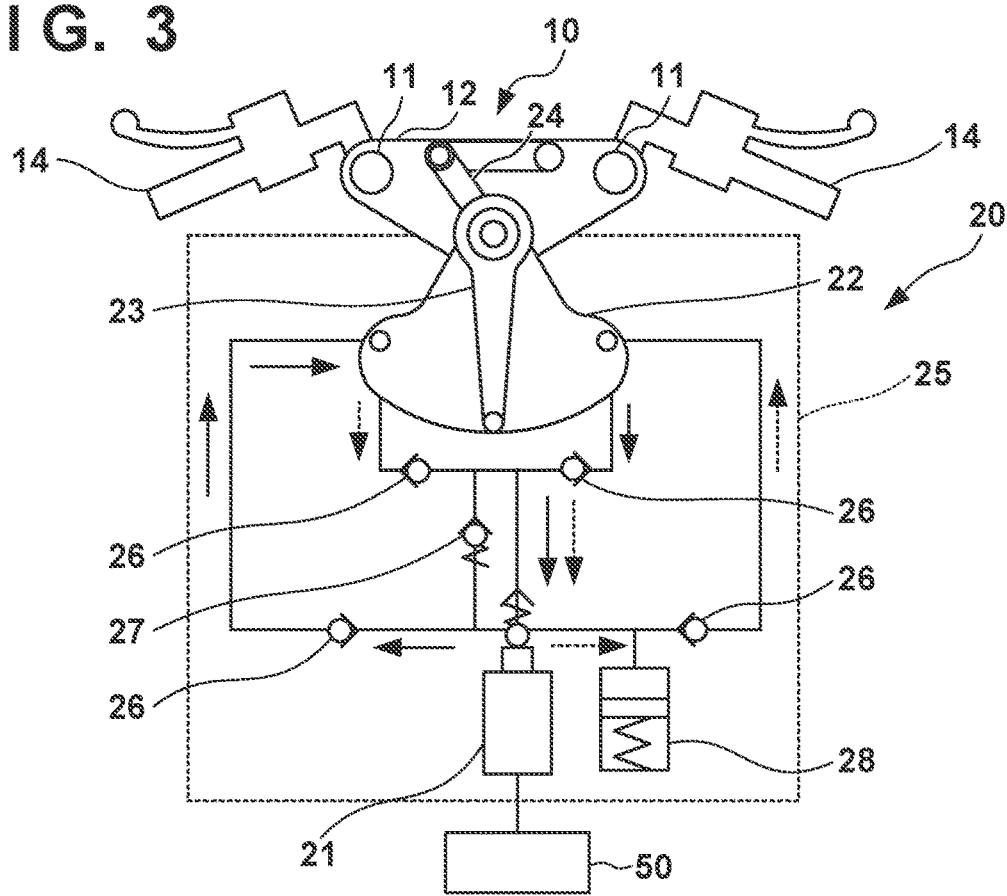
FIG. 3 is a schematic view illustrating a configuration of a steering damper device according to one embodiment.

FIG. 3 is a schematic view illustrating a configuration of a steering damper device 20. The steering damper device 20 is a device capable of variably generating the damping force working on a rotating action of the steering mechanism 10. For example, in order to reduce a so-called kickback (reaction) that is a sudden oscillation of the handlebars 14, when an external force from the road surface during traveling works on the front wheel 101, the steering damper device 20 generates the damping force against the oscillation.

In the present embodiment, the steering damper device 20 is an electronically controlled steering damper, and is capable of variably controlling the damping force by controlling the drive current of a solenoid valve 21.

The steering damper device 20 is a hydraulic rotary type in which a swingable vane 23 is disposed in an oil chamber 22 having a fan shape in a plan view, and uses, as the damping force, a flow resistance of hydraulic oil in the oil chamber 22 generated when the vane 23 swings. The top bridge 12 is coupled through a link mechanism 24 with a base portion of the vane 23.

The steering damper device 20 includes a hydraulic control circuit 25. The hydraulic control circuit 25 includes the solenoid valve 21. The solenoid valve 21 is driven by a control unit 50 to be described later. The control unit 50 drives the solenoid valve 21 to change the opening area of the valve and change the flow resistance of the hydraulic oil. That is, the control unit 50 controls the drive current of the solenoid valve 21 to control the damping force generated by the steering damper device 20. The hydraulic control circuit 25 also includes a check valve 26, a relief valve 27, and an accumulator 28. Solid arrows in the drawing each indicate a flow of the hydraulic oil when the steering mechanism 10 makes a turn to the left. Furthermore, dotted arrows in the drawing each indicate a flow of the hydraulic oil when the steering mechanism 10 makes a turn to the right.

Note that, in the present embodiment, the configuration of the steering damper device 20 is given as an example, and any other known configuration is adoptable. For example, the steering damper device 20 may be a cylinder type.

Control Configuration

Figure 4:
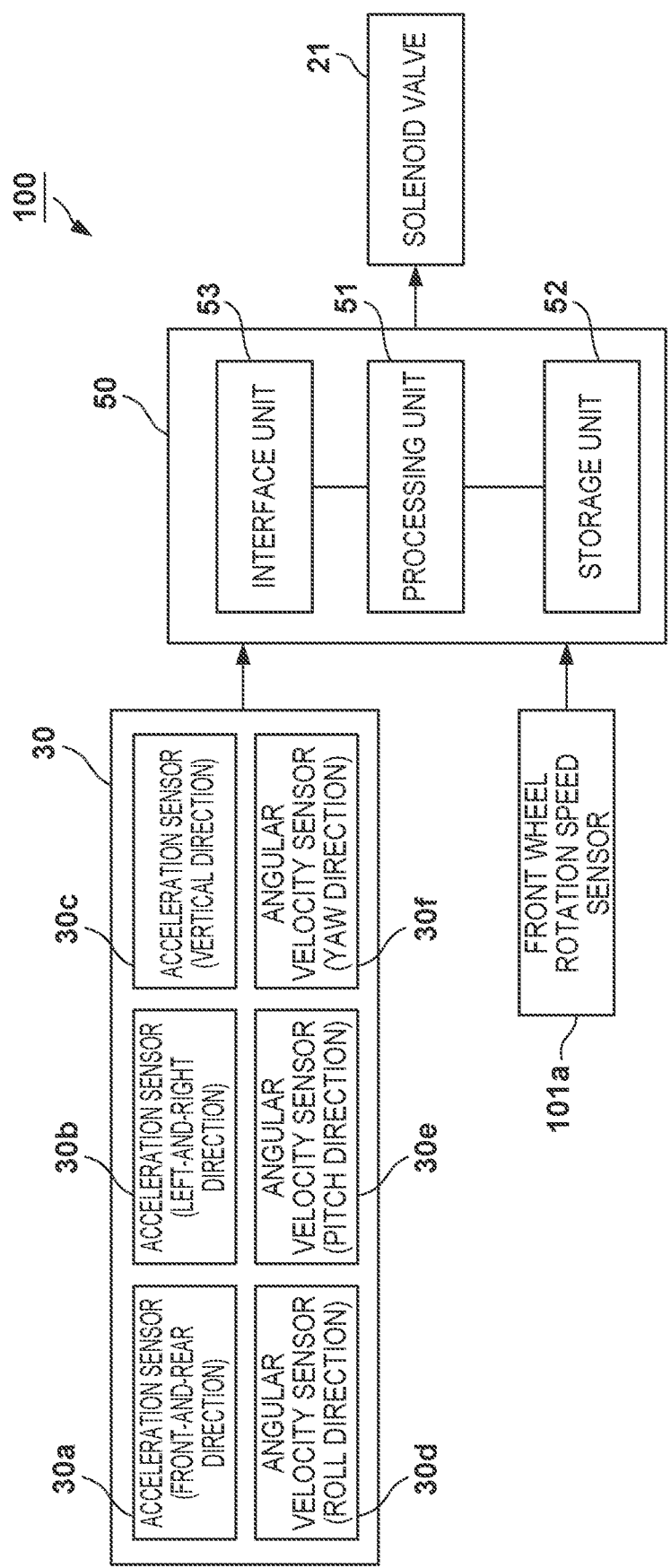
FIG. 4 is a block diagram illustrating an example of a control configuration of the straddle type vehicle according to one embodiment.

FIG. 4 is a block diagram illustrating an example of a control configuration of the vehicle 100. FIG. 4 mainly illustrates a configuration necessary in relation to the present embodiment to be described later.

The vehicle 100 includes the control unit 50 configured with an electric control unit (ECU) or the like. The control unit 50 includes a processing unit 51, a storage unit 52 such as a RAM and a ROM, and an interface unit 53 (I/F unit) that relays transmission and reception of signals between an external device and the processing unit 51. The processing unit 51 is a processor represented by a CPU, and executes a program stored in the storage unit 52. In the storage unit 52, data and the like used by the processing unit 51 for processing, in addition to the program executed by the processing unit 51, are stored.

In the present embodiment, the control unit 50 controls the damping force of the steering damper device 20. More specifically speaking, the control unit 50 controls the damping force of the steering damper device 20 when a vehicle 100 is braking while turning.

Note that the control unit 50 may include a plurality of electric control units (ECUs), and each of them may include a processor, a storage device, and an external I/F. For example, the control unit 50 may include a drive controlling ECU that controls driving of the power unit 104 and a damping force controlling ECU that controls the damping force of the steering damper device 20. Note that the number of ECUs and the functions assigned to the respective ECUs can be designed as appropriate, and can be subdivided or integrated as compared with the above example.

The vehicle 100 includes a front wheel rotation speed sensor 101a that detects the rotation speed of a front wheel 101.

An inertial measurement unit (IMU) 30 is a sensor unit that detects a behavior of the vehicle 100, and is disposed, for example, near the center of gravity of the vehicle 100. In the case of the present embodiment, the IMU 30 includes acceleration sensors 30a to 30c that respectively detect accelerations in a front-and-rear direction, a left-and-right direction, and a vertical direction of the vehicle 100, and respective angular velocity sensors 30d to 30f that detect the respective angular velocities in a roll direction, a pitch direction, and a yaw direction of the vehicle 100.

Process Example of Control Unit

Figure 5:
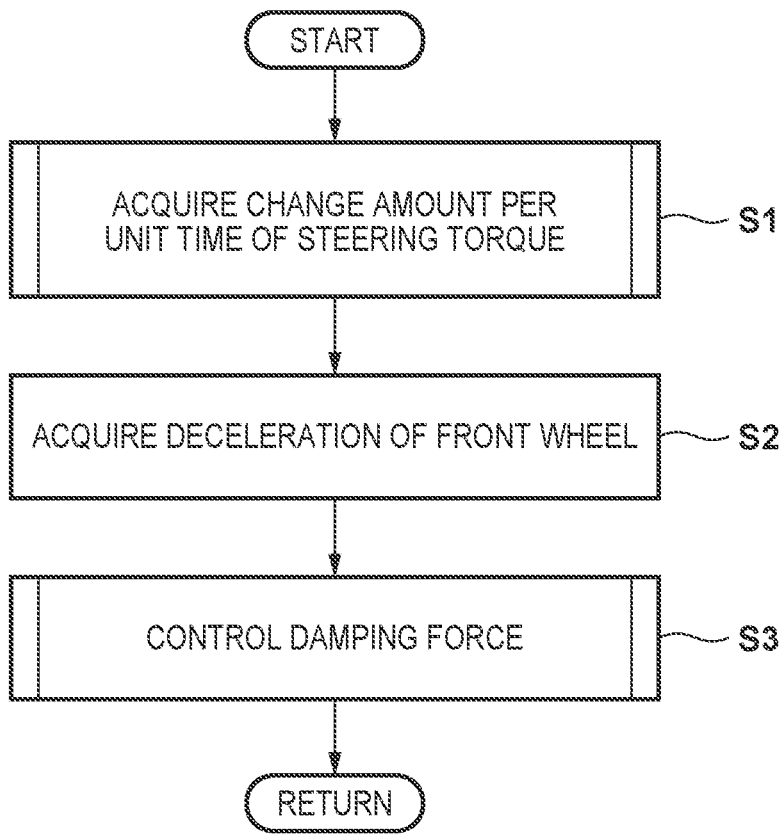
FIG. 5 is a flowchart illustrating a process example of a control unit according to one embodiment.
Figure 6:
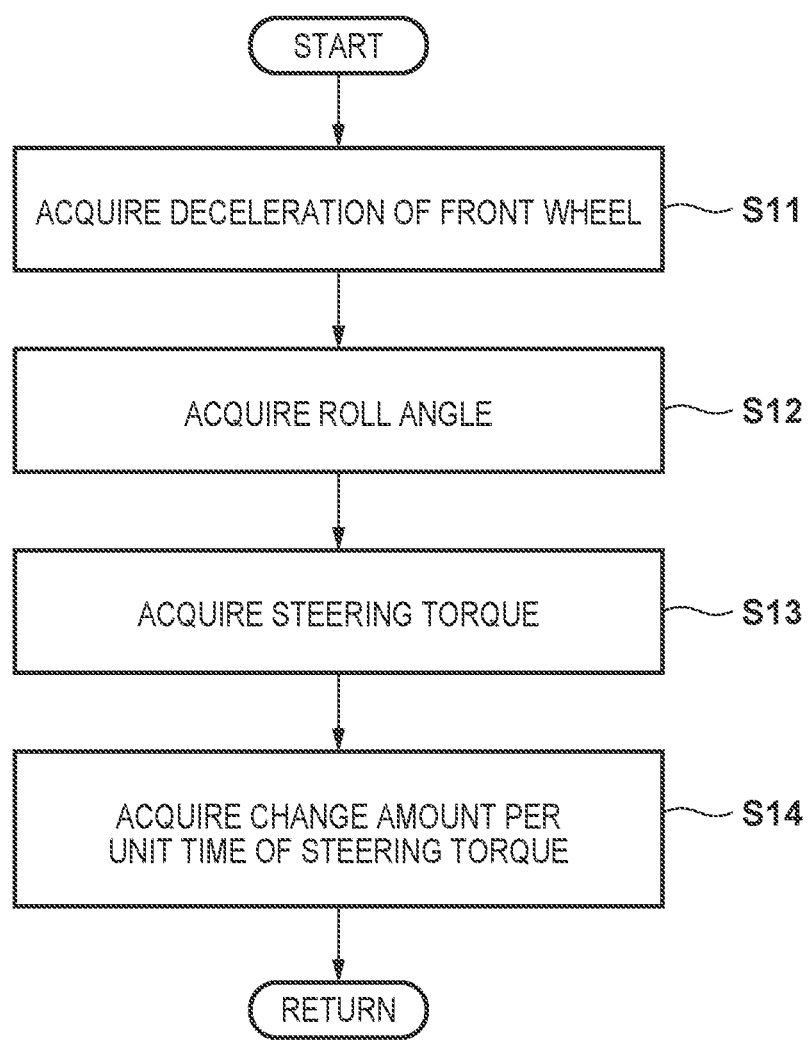
FIG. 6 is a flowchart illustrating a process example of the control unit according to one embodiment.
Figure 7:
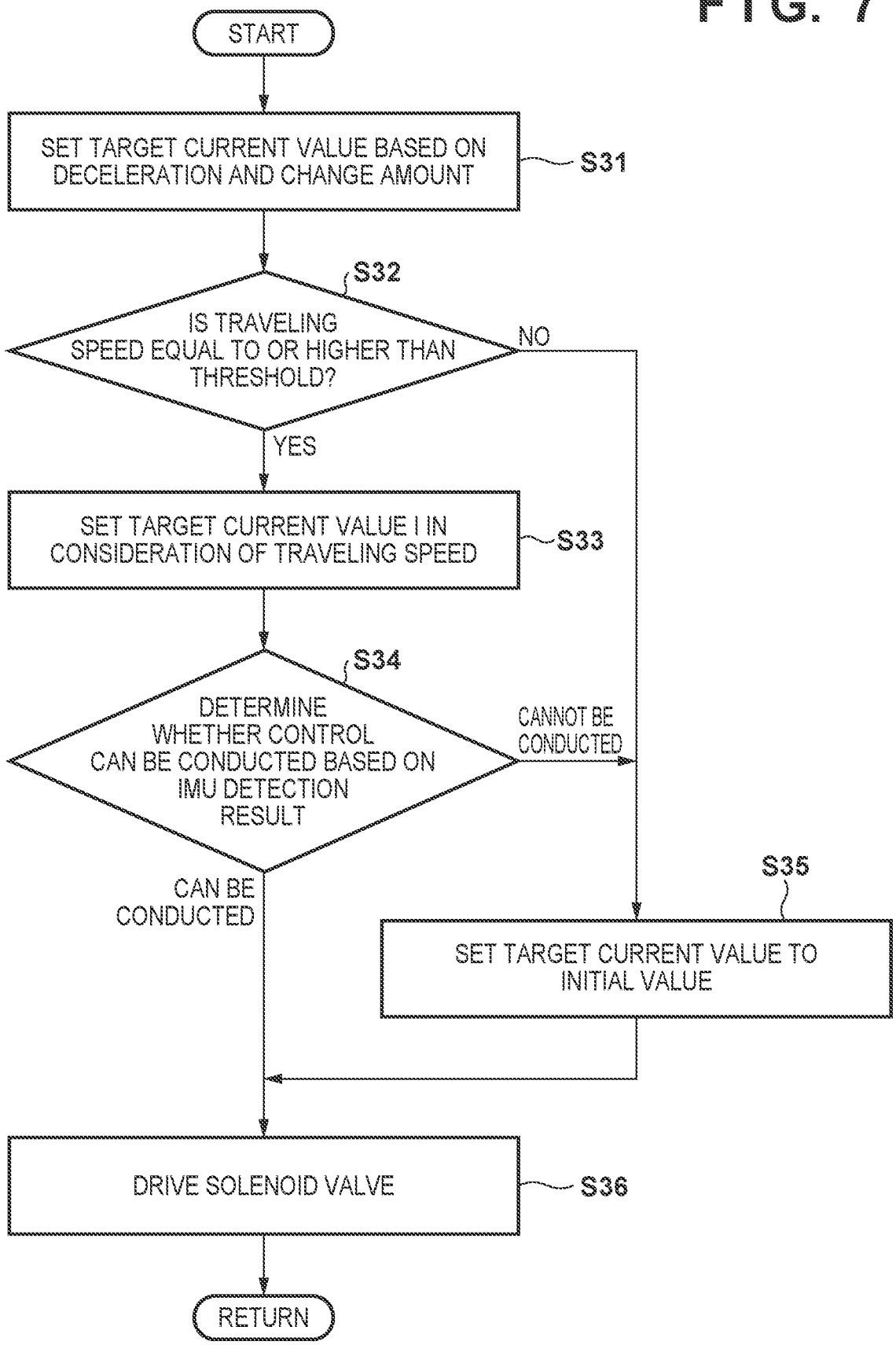
FIG. 7 is a flowchart illustrating a process example of the control unit according to one embodiment.

A process example of the control unit 50 will be described. FIGS. 5 to 7 are flowcharts each illustrating an example of a process performed by the control unit 50. FIG. 5 is an example of damping force control, of the steering damper device 20 at the time of braking while turning, to be conducted by the control unit 50. Note that the magnitude of the damping force at the start of the present process is set to an initial value, and such an initial value can be appropriately set, based on the configuration or the like of the vehicle 100 or the steering damper device 20.

In S1, the control unit 50 acquires a change amount $\Delta Trq/\Delta t$ per unit time of steering torque Trq. Details will be described later (see FIG. 6).

In S2, the control unit 50 acquires deceleration a (m/s$^2$) of the front wheel 101. For example, the control unit 50 acquires the deceleration a, based on a detection result of the front wheel rotation speed sensor 101*a*. As an example, the control unit 50 calculates (in other words, differentiates) a change amount per unit time of the rotation speed of the front wheel 101 that has been detected by the front wheel rotation speed sensor 101*a*, and acquires the deceleration a.

In S3, the control unit 50 conducts the damping force control of the steering damper device 20. The control unit 50 determines the damping force based on the change amount $\Delta Trq/\Delta t$ acquired in S1, the deceleration a acquired in S2, and the like, and controls the damping force of the steering damper device 20 such that the steering damper device 20 generates its damping force. That is, the control unit 50 controls the damping force based on the change amount $\Delta Trq/\Delta t$ acquired in S1, the value of the deceleration a acquired in S2, and the like. In the present embodiment, the control unit 50 controls the drive current of the solenoid valve 21 so that the steering damper device 20 generates a desired damping force. Details will be described later (see FIG. 7).

FIG. 6 is a flowchart illustrating a detailed example of a process of acquiring the steering torque Trq in S1 of FIG. 5. In S11, the control unit 50 acquires the deceleration a of the front wheel 101. The control unit 50 acquires the deceleration a, for example, in a process similar to the process of S2.

In S12, the control unit 50 acquires a bank angle (roll angle) $\theta$ of the vehicle 100. For example, the control unit 50 integrates a detection result (roll angular velocity) of the angular velocity sensor 30*d* in the roll direction, and acquires the bank angle $\theta$.

Figure 8:
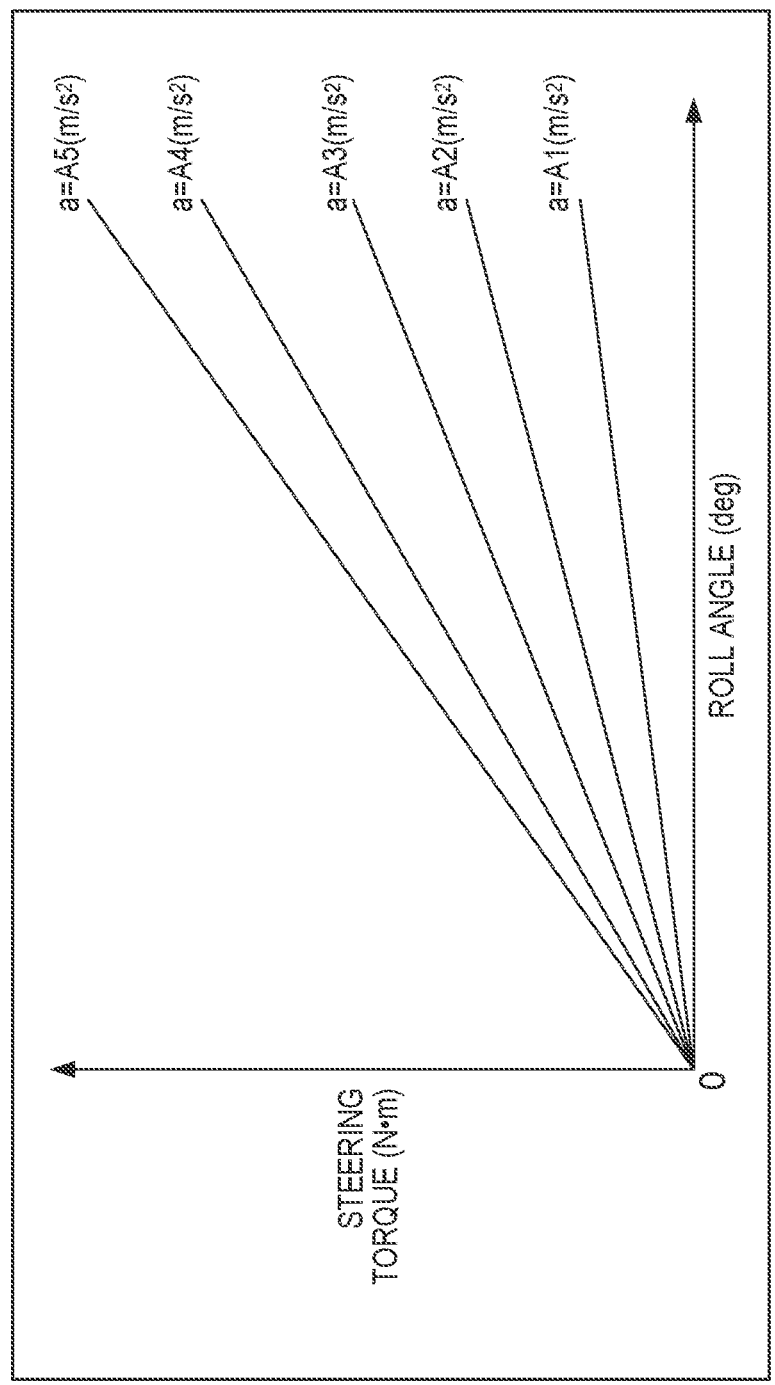
FIG. 8 is a diagram illustrating an example of a table indicating a relationship between a deceleration and a bank angle of a front wheel, and an estimated value of steering torque.

In S13, the control unit 50 acquires the steering torque Trq. In the present embodiment, the control unit 50 estimates the steering torque Trq, based on the deceleration a acquired in S11 and the bank angle $\theta$ acquired in S12. FIG. 8 is a diagram illustrating an example of a table illustrating a relationship between the deceleration a and the bank angle $\theta$ of the front wheel 101, and the estimated value of the steering torque Trq. The control unit 50 refers to this table, and estimates the steering torque Trq, based on the deceleration a and the bank angle $\theta$.

In the present embodiment, the estimated value of the steering torque Trq is set to be larger, as the roll angle (bank angle) becomes larger. In addition, in the case of the present embodiment, the deceleration has a magnitude relationship of A5>A4>A3>A2>A1, and the estimated value of the steering torque Trq is set to be larger, as the deceleration a becomes larger.

From one point of view, it can be said that the control unit 50 is capable of grasping a brake state of the vehicle 100 from the deceleration a, and is capable of grasping the turning state of the vehicle from the bank angle. Therefore, it can be said that the control unit 50 estimates the steering torque Trq based on the deceleration a and the bank angle $\theta$ to estimate the steering torque Trq in accordance with the vehicle state at the time of braking while turning.

Note that as a method for acquiring the steering torque Trq, another method is adoptable. For example, the control unit 50 may calculate the steering torque Trq based on various parameters. As an example, the control unit 50 may calculate the steering torque Trq, based on parameters such as a vehicle weight, the deceleration a, the roll angle $\theta$, a front wheel assigned load, and a ground point lateral movement amount.

In S14, the control unit 50 acquires the change amount $\Delta Trq/\Delta t$ per unit time of the steering torque Trq. In the present embodiment, the control unit 50 acquires the change amount $\Delta Trq/\Delta t$ based on the steering torque Trq acquired in S13. For example, the control unit 50 stores the value of the steering torque Trq acquired in a previous process, and divides the change amount of the steering torque from the previous process time to the current process time by the control cycle to calculate the change amount $\Delta Trq/\Delta t$. Note that in the case of a first control cycle, the control unit 50 may calculate a change amount from a predetermined initial value, or may output $\theta$ as the change amount.

FIG. 7 is a flowchart illustrating a detailed example of the process of the damping force control in S3 of FIG. 5. In S31, the control unit 50 sets a target current value I of the solenoid valve 21 to generate a desired damping force, based on the change amount $\Delta Trq/\Delta t$ acquired in S1 and the deceleration a acquired in S2.

As an example, the control unit 50 may set the target current value I so that the damping force increases, as the change amount $\Delta Trq/\Delta t$ becomes larger. In a case where the damping force is made too large when the change amount $\Delta Trq/\Delta t$ is small, the rider may feel strange in some cases. This may affect the riding feeling in some cases. On the other hand, in a case where the change amount $\Delta Trq/\Delta t$ is large, the rider may not be able to handle a sudden inclination caused by the steering mechanism at the time of turning, in some cases. Therefore, the control unit 50 may set the target current value I so that the damping force increases, as the change amount $\Delta Trq/\Delta t$ becomes larger. By increasing the damping force, as the change amount $\Delta Trq/\Delta t$ becomes larger, it is possible to prevent the rider from feeling strange due to the generation of the damping force more than necessary, and it is possible to generate a larger damping force for a sudden inclination that the rider cannot handle or that is difficult to handle.

In addition, the control unit 50 may set the target current value I so that the damping force increases, as the deceleration a becomes larger. It is considered that the vehicle 100 is more likely to slip, as the deceleration a becomes larger. By controlling the damping force based on the deceleration a, an occurrence of slip can be suppressed.

Furthermore, the control unit 50 may control the damping force based on the product of the change amount $\Delta Trq/\Delta t$ and the deceleration a (that is, set the target current value I). The slip at the time of braking while turning is likely to occur, when the deceleration a is large and the change amount $\Delta Trq/\Delta t$ is large. By controlling the damping force, based on the product of the change amount $\Delta Trq/\Delta t$ and the deceleration a, it is possible to control the damping force in accordance with the ease of slipping, and it is possible to further suppress the occurrence of slip of the vehicle 100.

In S32, the control unit 50 checks whether the traveling speed of the vehicle 100 is equal to or higher than a threshold. The control unit 50 proceeds to S33 in a case where the traveling speed is equal to or higher than the threshold, and proceeds to the process of S35 in a case where the traveling speed is lower than the threshold. For example, the control unit 50 acquires the traveling speed of the vehicle 100, based on the detection result of the front wheel rotation speed sensor 101*a*, and checks whether the traveling speed is equal to or higher than the threshold.

In S33, the control unit 50 sets the target current value I in consideration of the traveling speed of the vehicle 100. For example, the control unit 50 may set the target current value I to further suppress an increase of the damping force, as the vehicle body speed of the vehicle 100 becomes faster. When the vehicle body speed of the vehicle 100 is high, the deceleration a tends to increase due to a disturbance such as an engine brake or a centrifugal force. Therefore, in a case where the damping force is determined based on the deceleration a, the damping force may become large more than necessary, in some cases. Therefore, by further suppressing an increase in the damping force, as the vehicle body speed of the vehicle 100 becomes higher, it is possible to suppress the oscillation of the steering mechanism 10 in a more effective manner in accordance with the vehicle speed. As an example, the control unit may determine the target current value I in consideration of the traveling speed, based on the table indicating the relationship between the target current value I set in S31 and the target current value I in consideration of the traveling speed. In addition, for example, the control unit 50 may multiply the target current value I set in S31 by a coefficient corresponding to the traveling speed to determine the target current value I.

In S34, the control unit 50 determines whether to be capable of conducting the damping force control, based on a detection result of the IMU 30. In a case of determining that the control can be conducted, the control unit 50 proceeds to the process of S36, whereas in a case of determining that the control cannot be conducted, the control unit 50 proceeds to the process of S35. For example, it is conceivable that the control unit 50 makes an erroneous determination regarding the deceleration a, due to erroneous detection, a failure, or the like of the front wheel rotation speed sensor 101*a*. In this case, it is conceivable that the control unit 50 will increase the damping force in an unnecessary situation. Hence, by increasing the damping force only when the vehicle 100 is actually decelerating in accordance with the detection result of the IMU 30, the control unit 50 is capable of suppressing an influence on the riding feeling due to an unnecessary control intervention. For example, the control unit 50 may determine whether to be capable of conducting the control, based on the detection result of the acceleration sensor 30*a* in the front-and-rear direction or the like.

In S35, the control unit 50 sets the target current value I to an initial value. That is, in a case where the traveling speed of the vehicle 100 does not reach a threshold, or in a case where the IMU 30 cannot detect that the vehicle 100 is actually decelerating, the target current value I is set to the initial value. This enables prevention of an unnecessary control intervention, and reduces the rider's strange feeling.

In S36, the control unit 50 drives the solenoid valve 21 with the target current value I that has been set. That is, the control unit 50 drives the solenoid valve 21 to control the damping force of the steering damper device 20.

As described heretofore, according to the present embodiment, the damping force of the steering damper device 20 is controlled, based on the change amount ΔTrq/Δt per unit time of the steering torque Trq generated in the steering mechanism 10 and the deceleration a of the front wheel 101. Therefore, it is possible to suppress the oscillation of the steering mechanism 10 in accordance with a vehicle state at the time of braking while turning. More specifically speaking, the damping force is controlled in a more effective manner in accordance with a vehicle body situation. Therefore, it is possible to suppress the oscillation of the steering mechanism 10 at the time of braking while turning, while reducing the strange feeling of the rider due to an unnecessary increase in the damping force.

Note that in setting the target current value I of the solenoid valve 21, the control unit 50 may decrease the target current value I at a constant rate, in a case where the target current value I decreases. In other words, in setting the target current value I of the solenoid valve 21, the control unit 50 is also capable of adopting a configuration of applying a rate limit to a downstream side. In the present embodiment, the damping force is generated against a sudden rise of the steering torque Trq to suppress the oscillation of the steering mechanism 10. Therefore, responsiveness when the damping force increases (at the rising time) is important. However, in a case where the damping force is lowered as soon as a high damping force is no longer needed, the effect of the control may be weakened, or the rider may feel strange, in some cases. Therefore, by gradually reducing the damping force that has been generated, it is possible to suppress the oscillation of the steering mechanism 10 in a more effective manner.

In addition, the present embodiment has been described by focusing on the damping force control (for convenience, the damping force control for the time of braking while turning) of the steering damper device 20 at the time of braking while turning. However, the control unit 50 may conduct another type of the damping force control of the steering damper device 20 in parallel, in accordance with the traveling state of the vehicle 100.

As an example, the control unit 50 may conduct the damping force control (for convenience, referred to as damping force control for the time of normal traveling) of the steering damper device 20 based on the vehicle body speed, the acceleration, or the like. For example, the control unit 50, in the normal traveling, while controlling the damping force of the steering damper device 20 in accordance with the damping force control for the time of normal traveling, may allow the damping force control for the time of braking while turning to intervene at the time of braking while turning. For example, the control unit 50 may compare the desired damping force based on the damping force control for the time of normal traveling with the desired damping force based on the damping force control for the time of braking while turning, and may set the maximum value of them as a final output of the damping force. More specifically speaking, the control unit 50 may compare the target current value I of the solenoid valve 21 based on the damping force control for the time of normal traveling with the target current value I of the solenoid valve 21 based on the damping force control for the time of braking while turning, and may select the maximum value of them.

Other Embodiments

Figure 9:
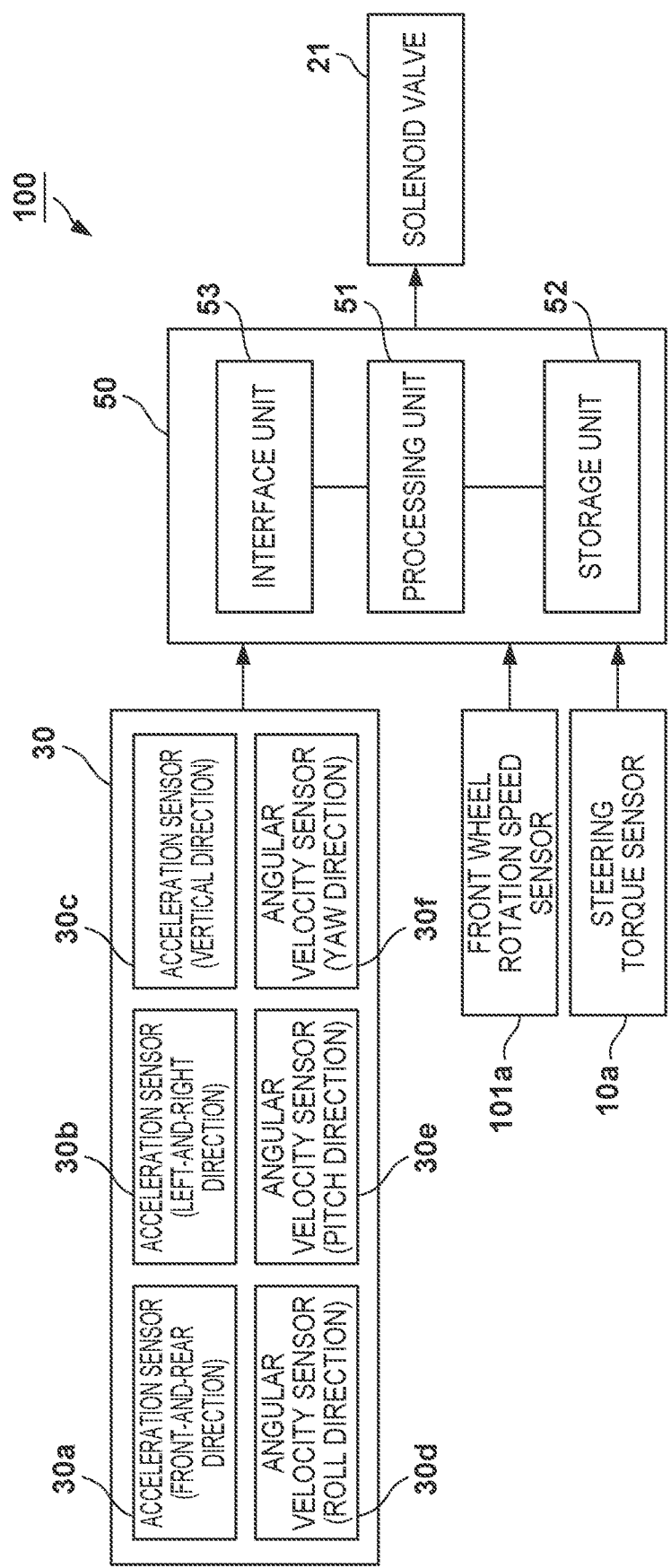
FIG. 9 is a block diagram illustrating an example of a control configuration of the straddle type vehicle according to one embodiment.

FIG. 9 is a block diagram illustrating an example of a control configuration of the vehicle 100 according to another embodiment. The present embodiment is different from the above embodiment in that the vehicle 100 includes a steering torque sensor 10*a*. In the following description, the same components as those of the above-described embodiment are denoted by the same reference numerals, and the descriptions will be omitted.

The steering torque sensor 10a detects torque generated in the steering mechanism 10. As the steering torque sensor 10a, a known configuration such as a magnetostrictive torque sensor or a strain gauge torque sensor is adoptable.

Figure 10:
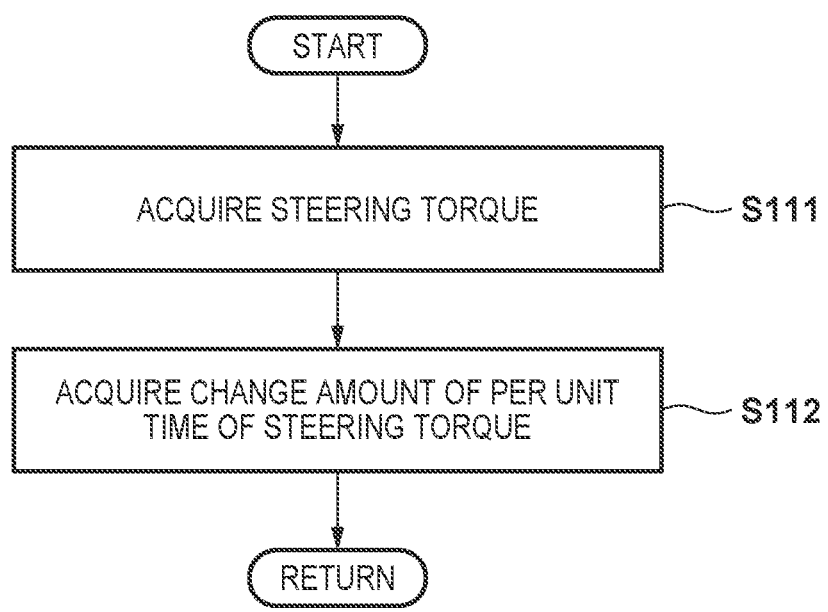
FIG. 10 is a flowchart illustrating a process example of the control unit according to one embodiment.

FIG. 10 is a flowchart illustrating an example of the damping force control of the steering damper device 20 according to another embodiment, and illustrates a detailed example of the process of S1 in FIG. 5, in a case where the steering torque is acquired, based on a detection result of the steering torque sensor 10a.

In S111, the control unit 50 acquires the steering torque Trq, based on the detection result of the steering torque sensor 10a. S112 is similar to the process of S14 in FIG. 6. According to the present embodiment, the steering torque Trq generated in the steering mechanism 10 can be directly acquired as a measured value instead of an estimated value.

In addition, in the above embodiments, the power unit 104 is an engine. However, a configuration including an electric motor as the power unit 104 or a configuration including both an internal combustion engine and an electric motor is also adoptable. That is, the vehicle 100 may be an electric vehicle or a hybrid vehicle.

Summary of Embodiments

The above-described embodiments disclose at least a straddle type vehicle and a control device to be described as follows.

1. A straddle type vehicle (1) of the above embodiments comprises:
   a steering mechanism (1) configured to steer a front wheel;
   a steering damper device (20) capable of variably generating a damping force working on a rotating action of the steering mechanism; and
   a control unit (50) configured to control the damping force of the steering damper device, wherein
   the control unit controls the damping force, based on a change amount per unit time of steering torque generated in the steering mechanism and a deceleration of the front wheel (S1, S2, S3).

According to this embodiment, the damping force is controlled, based on a change amount per unit time of the steering torque generated in the steering mechanism and the deceleration of the front wheel. Therefore, it is possible to suppress the oscillation of the steering mechanism at the time of braking while turning in accordance with the vehicle state at the time of braking while turning.

2. In the above embodiments, the control unit controls the damping force such that the damping force increases, as the change amount is increased (S31).

According to this embodiment, it is possible to generate a larger damping force for a sudden inclination caused by the steering mechanism that the rider is not able to handle, and it is possible to suppress the vibration of the steering mechanism in a more effective manner.

3. In the above embodiments, the control unit controls the damping force such that the damping force increases, as the deceleration is increased (S31).

According to this embodiment, the damping force becomes larger, in a state in which the deceleration is large and the vehicle is more likely to slip. Therefore, it is possible to suppress an occurrence of slip in a more effective manner.

4. In the above embodiments, the control unit controls the damping force, based on a product of the change amount and the deceleration (S31).

According to this embodiment, the damping force is controlled in accordance with the likelihood of the occurrence of slip at the time of braking while turning. Therefore, it is possible to suppress the occurrence of slip in a more effective manner.

5. In the above embodiments, the control unit estimates the steering torque, based on a roll angle of the straddle type vehicle and the deceleration of the front wheel (S11, S12, S13).

According to this embodiment, the steering torque can be estimated in accordance with the vehicle state at the time of braking while turning.

6. In the above embodiments, the straddle type vehicle further comprises
   a torque sensor (10a) configured to detect magnitude of the steering torque generated in the steering mechanism, wherein
   the control unit acquires the steering torque, based on a detection result of the torque sensor (S111).

According to this embodiment, the magnitude of the steering torque is directly acquirable.

7. In the above embodiments, the straddle type vehicle further comprises
   a detection unit (101a) configured to detect a rotation speed of the front wheel, wherein
   the control unit acquires the deceleration of the front wheel, based on a detection result of the detection unit (S2, S11).

According to this embodiment, the deceleration of the front wheel is acquirable from the rotation speed of the front wheel.

8. In the above embodiments, in a case where a vehicle body speed of the straddle type vehicle is equal to or higher than a threshold, the control unit controls the damping force, based on the change amount and the deceleration (S32).

According to this embodiment, it is possible to avoid an unnecessary increase in the damping force, in a case where the vehicle body speed is lower than the threshold.

9. In the above embodiments, in controlling the damping force based on the change amount and the deceleration, the control unit suppresses an increase in the damping force, as a vehicle body speed of the straddle type vehicle increases (S33).

According to this embodiment, by suppressing an increase in the damping force at the time of traveling at high speeds, while the deceleration tends to increase due to a disturbance, it is possible to suppress the oscillation of the steering mechanism in a more effective manner in accordance with the vehicle speed.

10. A control device (50) of the above embodiments is a control device to be applied to a straddle type vehicle, the straddle type vehicle including a steering mechanism (10) that steers a front wheel and a steering damper device (20) capable of variably generating a damping force working on a rotating action of the steering mechanism, the control device being configured to control the damping force of the steering damper device, wherein
   the control device controls the damping force, based on a change amount per unit time of steering torque generated in the steering mechanism and a deceleration of the front wheel (S1, S2, S3).

According to this embodiment, the damping force is controlled, based on a change amount per unit time of the steering torque generated in the steering mechanism and the deceleration of the front wheel. Therefore, it is possible to suppress the oscillation of the steering mechanism at the time of braking while turning in accordance with the vehicle state at the time of braking while turning.

The invention is not limited to the foregoing embodiments, and various variations/changes are possible within the spirit of the invention.

What is claimed is:

1. A straddle type vehicle comprising:
 a steering mechanism configured to steer a front wheel;
 a steering damper device capable of variably generating a damping force working on a rotating action of the steering mechanism; and
 a controller including a processor and a storage device, and configured to control the damping force of the steering damper device, wherein
 the controller controls the damping force, based on a product of a change amount per unit time of steering torque generated in the steering mechanism and a deceleration of the front wheel.

2. The straddle type vehicle according to claim 1, wherein the controller controls the damping force such that the damping force increases, as the change amount is increased.

3. The straddle type vehicle according to claim 1, wherein the controller controls the damping force such that the damping force increases, as the deceleration is increased.

4. The straddle type vehicle according to claim 1, wherein the controller estimates the steering torque, based on a roll angle of the straddle type vehicle and the deceleration of the front wheel.

5. The straddle type vehicle according to claim 1, further comprising
 a torque sensor configured to detect magnitude of the steering torque generated in the steering mechanism, wherein
 the controller acquires the steering torque, based on a detection result of the torque sensor.

6. The straddle type vehicle according to claim 1, further comprising
 a sensor configured to detect a rotation speed of the front wheel, wherein
 the controller acquires the deceleration of the front wheel, based on a detection result of the sensor.

7. The straddle type vehicle according to claim 1, wherein in a case where a vehicle body speed of the straddle type vehicle is equal to or higher than a threshold, the controller controls the damping force, based on the product of the change amount and the deceleration.

8. The straddle type vehicle according to claim 1, wherein in controlling the damping force based on the product of the change amount and the deceleration, the controller suppresses an increase in the damping force, as a vehicle body speed of the straddle type vehicle increases.

9. A control device to be applied to a straddle type vehicle, the straddle type vehicle including a steering mechanism that steers a front wheel and a steering damper device capable of variably generating a damping force working on a rotating action of the steering mechanism, the control device including a processor and a storage device, and being configured to control the damping force of the steering damper device, wherein
 the control device controls the damping force, based on a product of a change amount per unit time of steering torque generated in the steering mechanism and a deceleration of the front wheel.

* * * * *